Figure 1:
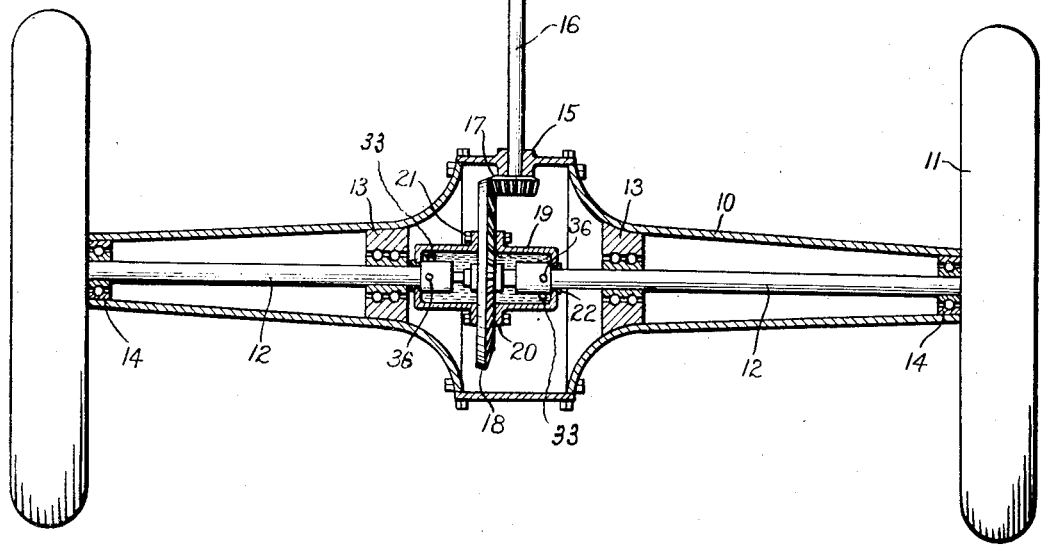

Nov. 7, 1933.　　　　F. U. CONARD　　　　1,934,039
DIFFERENTIAL DRIVE MECHANISM
Filed Dec. 10, 1931　　　2 Sheets-Sheet 1

INVENTOR.
Frederick U. Conard
BY
Christian M. Newman
ATTORNEY

Nov. 7, 1933.   F. U. CONARD   1,934,039
DIFFERENTIAL DRIVE MECHANISM
Filed Dec. 10, 1931   2 Sheets-Sheet 2

INVENTOR.
Frederick U. Conard
BY
Christian M. Newman
ATTORNEY

Patented Nov. 7, 1933

1,934,039

UNITED STATES PATENT OFFICE 1,934,039

DIFFERENTIAL DRIVE MECHANISM

Frederick U. Conard, Rockford, Ill.

Application December 10, 1931
Serial No. 580,070

14 Claims. (Cl. 74—7)

My invention relates to transmission mechanism for automobiles or the like, and more particularly to differential mechanism such as is usually associated with the driving axle and adapted to provide for the driving of the respective wheels at different speeds, if necessary.

It is the purpose of my invention to produce a differential mechanism which is less costly to manufacture than the present commercial forms, and further, to provide a mechanism of this sort which will insure a positive, forward or backward drive, as the case may be, and yet to allow either wheel and its axle member to rotate in the same direction as the other axle and wheel and at a higher rate of rotation, or both wheels and their axle members to rotate at a higher rate of rotation than the driving member rotates, but will not permit either axle and wheel mounted thereon, to be driven at a slower rate of speed than the driving member rotates. The driving member referred to may be a ring gear as used in the present commercial forms of different mechanisms. The invention is obviously applicable to the present two-piece form of rear or front driving axle, that is an axle comprising separate axially aligned halves, the inner ends of which are journaled within the differential transmission housing and therein connected to be driven in a manner to be later described.

A further object of the invention is to reduce unequal wear on tires resulting from either unequal inflation of driving tires or difference in size or tread design.

A further object of the invention is to produce a differential mechanism which will reduce the tendency to skid which results in the use of the present accepted type of differential mechanism, when either wheel loses traction by striking a slippery spot, or for other causes, resulting from the fact that the said present accepted type of mechanism allows one of the wheels to be driven faster and independent of the other, my invention differing in this respect from the fact that it will not permit either wheel to be driven faster than the other wheel but will permit either wheel to run for a limited time faster than the driving member or driven wheel, thus preventing unequal traction on slippery surfaces, and also compensating for the difference in length of surface covered when rounding corners or curves.

A further object of the invention is to provide for a limited "free wheeling" effect when the motor having been retarded the driven wheels may both for a limited period rotate faster than the driving member rotates.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit, or sacrificing any of the advantages of the invention.

Figure 2:
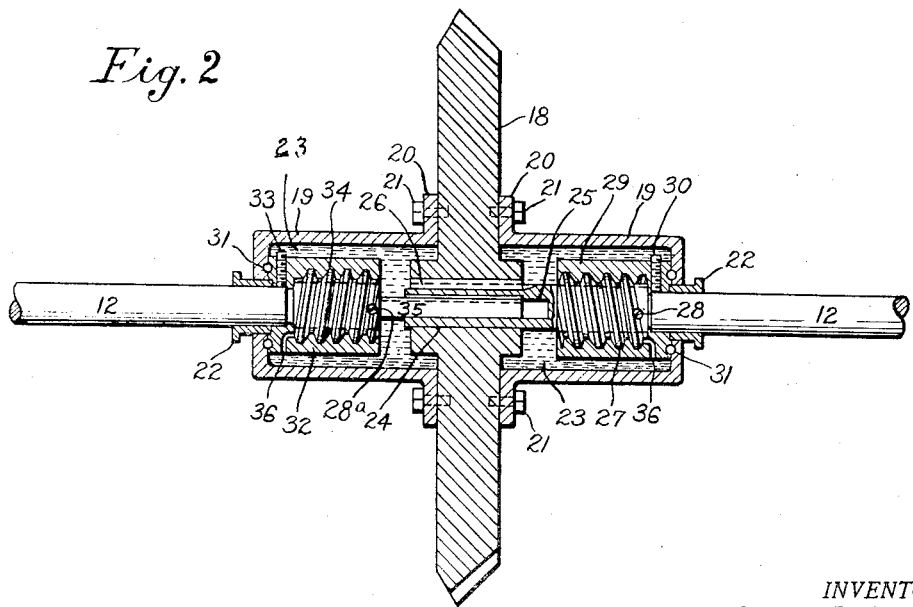
Figure 3:
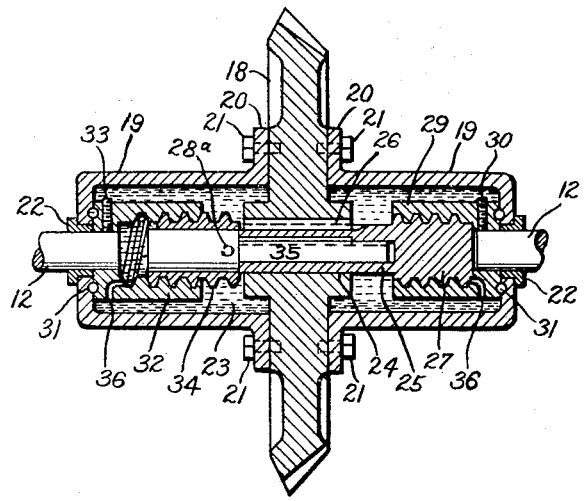
Figure 4:
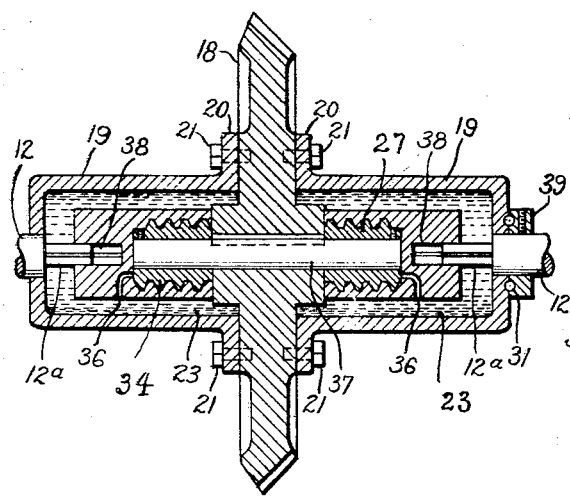
Figure 5:
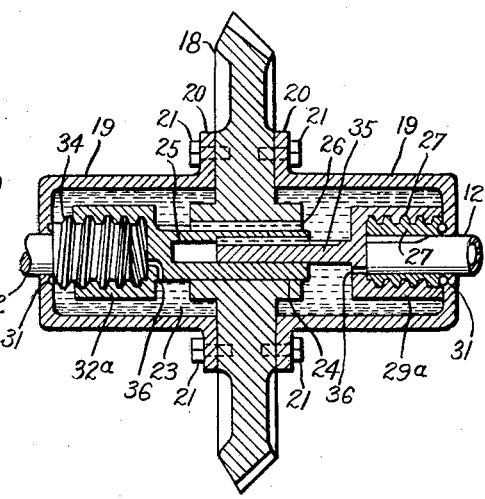

Similar characters of reference denote like or corresponding parts throughout the several figures of the accompanying drawings forming a part of this specification and upon which Fig. 1 shows a sectional plan view of a rear axle housing enclosing a preferred form of my differential mechanism as applied between a drive shaft and the aligned rear axle members;

Fig. 2 is an enlarged sectional view of the differential shown in the housing of Fig. 1, the parts being in a corresponding position;

Fig. 3 is a further sectional view of the mechanism shown in Fig. 2, the worm upon one section of the rear axle being run in against the hub of the driving gear as a result of the faster rotation of that section of the axle; and Figs. 4 and 5 show further longitudinal sectional views of slightly modified forms of the invention wherein the same result of operation is obtained by slightly different applications of the principle.

Referring in detail to the characters of reference marked upon the drawings, 10 represents a rear axle housing, for an automobile and 11—11 wheels mounted upon aligned rear axle members 12—12 journaled in suitable bearings 13—13 and 14—14 of the housing. This housing and particularly the enlarged portion thereof enclosing the differential mechanism may be varied in size and design, if necessary better to accommodate the said differential mechanism. This housing includes a bearing 15, for the drive shaft 16 which carries a pinion 17 within the housing that meshes with and drives a so-called ring gear 18 through which the differential mechanism and the respective aligned sections 12—12 of the rear axle are driven.

In accordance with the illustrations herein shown, the inner end portions of the aligned sections of the rear axle are journaled in bearings of the housing and these axle members in turn serve to support the before mentioned ring gear through the medium of hollow hub-like cylindrical extensions 19—19, each of which are provided with an annular flange 20 that is secured to opposite sides of the ring gear by means of screw bolts 21. These extensions may have their outer end portions bushed as at 22, (see Fig. 2) or otherwise provided with suitable bearings for the before mentioned aligned rear axle members 12—12. These cylindrical extensions not only serve to enclose and limit the longitudinal movement of the movable parts therein, later to be described, but further serve to retain viscous fluid 23 that forms a hydraulic shock absorber that serves to prevent jar when either worm having been screwed partly out of its sleeve it is again screwed back as for instance, when the car, in which the differential is installed, is stopped and the driver shifts into reverse. This operation on the part of the driver obviously causes the differential worms to feed out to the other end of their sleeves preliminary to picking up the load.

Referring more particularly to the construction shown in Figs. 1, 2 and 3, it will be observed that the ring gear is provided with a central hole 24 therethrough to receive a short longitudinally movable hollow shaft 25 which is driven by said ring gear through the keyed connection 26, said key being suitably fixed in one member and adapted to slide in the other, preferably the hollow shaft. Upon the outer end of this hollow shaft is a worm 27 which may be formed integral therewith or secured thereon, as by means of a set screw 28. This worm engages an internally threaded sleeve 29 that is secured to the inner end portion of one of the axle members 12 by a set screw 30 and is provided with a suitable thrust bearing 31 between its end and the extension 19. A similar sleeve 32 is secured to the other rear axle member 12 by means of a set screw 33 and is also provided with a thrust bearing 31. 34 represents a worm mounted within the threaded sleeve 32 and is secured to a relatively small shaft 35, by means of a set screw 28ª, that is mounted for reciprocatory movement in the before mentioned hollow shaft 25 to which it is slidably keyed; one of these pairs of worm and sleeve members includes a right and the other a left hand thread.

Suitable ports 36 are provided in the outer ends of the internally threaded sleeves 29 and 32 whereby the fluid 23 may enter the chambers formed between the sleeves and worms as the worm is run out of the sleeve, and whereby the fluid is again forced out as the worm is run back. The smallness of these ports limits the flow of fluid and consequently forms a cushion between the longitudinal and movable parts.

It will thus be understood, see Figs. 1 and 2, that with the drive of the ring gear, the housings 19—19 together with the hollow shaft 25 and the central shaft 35 are turned as a unit in a forward or backward direction, according to the application of power to the ring gear. If driven forward, as shown in Figs. 1 and 2, the worms 27 and 34 upon the said shafts will naturally screw into the sleeves 29 and 32 forcing the liquid 23 out through the ports 36, and shoulder themselves as indicated in Fig. 2 against the inner ends of the sleeves, forming a positive driving connection as between the shafts and the sleeves and consequently the axle members, thereby insuring a positive forward drive of both of said axles and in a way which still allows one wheel and its shaft, as for instance, the shaft 12 as shown at left in Fig. 3, to run slightly faster than the shaft 12 shown at the right in said figure, as for instance in turning a corner to the right in which case the off wheel, axle and sleeve run faster than the near wheel and its worm 27, the worm 34 turns out of the sleeve and shoulders itself against the hub of the ring gear, see Fig. 3, thus limiting the extent of the faster turning of said axle member and its wheel. By this means it will be obvious that either axle member and its wheel are free at any time, as for instance, in turning a corner, to run faster than the companion wheel and axle, and that when the corner is turned, the said faster running wheel may lag until its worm again abuts the inner end of the sleeve, thereby again assuming a normal position for direct driving. In this connection it will also be understood that the same conditions hold good in backing or driving of the ring gear in a reversed direction, in which case, of course, the preliminary reverse drive of the ring gear serves to run the worms in against the opposite faces of the hub of the ring gear to shoulder the same.

Fig. 4 shows a construction wherein the two worms 27 and 34 are fixed with respect to the ring gear by being mounted upon the projected end portions of a short shaft 37 secured within the hub of the ring gear. The sleeves 29 and 32 in this case are rotatably movable longitudinally with respect to the worms and are each provided with a central longitudinal shouldered pocket 38 to slidably receive the reduced shouldered ends 12ª of the connected axles 12—12. These axle members are each provided with a collar 39 that is positioned against the end of the extensions, and a suitable thrust bearing 31 is provided between these collars and extensions.

Fig. 5 shows a further modification which comes within the disclosure of my invention and includes telescopical shafts 25 and 35 as shown in Figs. 2 and 3, though one serves to carry a sleeve 29ª and the other a sleeve 32ª which move backward and forward between the inner faces of the extensions and the hub of the ring gear, and threadably engage worms 27 and 34 secured to the ends of the rear axle members 12 journaled in the ends of the extensions. Suitable thrust bearings 31 are also provided between said worms and said extensions. This form of the invention as well as that shown in the other figures all include pairs of worm and cooperating threaded sleeve members, having a right hand thread in one pair and a left hand thread in the other pair.

Having thus described my invention, what I claim and desire to secure by Letters Patent is:

1. A differential driving mechanism of the class described, comprising a pair of aligned spaced apart axle members, a driving gear mounted in axial alignment therewith, short shafts in the gear intermediate the axle members, extensions secured to opposite sides of the said driving gear internally threaded sleeves, bearings formed by said extensions for the respective axle members, a pair of worms to engage said sleeves, and connected to be driven by the driving gear and to drive the aligned axle members.

2. A differential driving mechanism of the class described, comprising a pair of aligned axle members, a driving gear mounted intermediate of the ends of said axle members and in axial alignment therewith, extensions secured to opposite sides of the said driving gear, internally threaded sleeves, each having a port leading therein, liquid within the housing and sleeves, bearings formed by said extensions for the respective axle members, a pair of worms to engage said sleeves, and connected to be driven by the driving gear and to drive the aligned axle members.

3. A differential driving mechanism of the class described, comprising a pair of aligned axle members, a driving gear in axial alignment therewith, a relatively short shaft mounted in the gear intermediate the aligned axle members, worms upon the shafts, extensions secured to opposite sides of the said driving gear forming bearings in which the respective axle members rotate, internally threaded sleeves to receive said worms, said worms connected to be driven by the driving gear and the sleeves connected to drive the aligned axle members.

4. A differential driving mechanism of the class described, comprising a pair of aligned axle members, a driving gear mounted intermediate of the ends of said axle members and in axial alignment therewith, shafts carried by said gear, worms upon the shafts, extensions secured to opposite sides of the said driving gear forming bearings for the respective axle members, internally threaded sleeves to receive said worms, each having a port leading therein, liquid within the housing and sleeves, said worms connected to be driven by the driving gear and the sleeves connected to drive the aligned axle members.

5. A differential driving mechanism of the class described, comprising a pair of aligned axle members, a driving gear in axial alignment therewith, shafts carried by said gear, worms upon the shafts, cylindrical extensions secured to opposite sides of the said driving gear forming bearings for the respective axle members, internally threaded sleeves to receive said worms, each having a port leading therein, said worms connected to be driven by the driving gear and the sleeves connected to drive the aligned axle members.

6. A differential driving mechanism of the class described, comprising a pair of aligned axle members, a driving gear mounted intermediate of the ends of said axle members and in axial alignment therewith, shafts carried by said gear, worms upon the shafts, cylindrical extensions secured to opposite sides of the said driving gear forming bearings for the respective axle members, internally threaded sleeves to receive said worms, each having a port leading therein, liquid within the housing and sleeves, said worms connected to be driven by the driving gear and the sleeves connected to drive the aligned axle members.

7. A differential driving mechanism of the class described, comprising a pair of aligned axle members, a driving gear mounted intermediate of the ends of said axle members and in axial alignment therewith, shafts carried by said gear, a worm upon each shaft, cylindrical extensions secured to opposite sides of the said driving gear forming housings and bearings for the respective axle members, internally threaded sleeves to receive said worms, each having a port leading therein, liquid within the housing and sleeves, said worm connected to be driven by the driving gear and the sleeves connected to drive the aligned axle members.

8. A differential driving mechanism of the class described, comprising a pair of spaced apart aligned axle members, a short shaft intermediate said axle members, a driving gear mounted on the short shaft, extensions secured to opposite sides of the said driving gear forming bearings for the respective axle members, internally threaded sleeves, worms to engage each of said threaded sleeves, each of said associated worms connected to be driven by the gear and adapted for forward independent movement thereon, and means to limit the amount of said independent forward movement.

9. A differential driving mechanism of the class described, comprising a pair of aligned axle members, a driving gear mounted intermediate of the ends of said axle members and in axial alignment therewith, intermediate driving means including worms and associated internally threaded sleeves, shafts mounted in the gear for carrying one each of said associated members, one of each of said associated members connected to be driven by the driving gear, and one of each of said associated members connected to drive the aligned axle members, one of said associated members being driven by the other and also adapted for limited independent forward movement with respect to the others of said associated members.

10. A differential driving mechanism of the class described, comprising a pair of aligned axle members, a driving gear mounted intermediate of the ends of said axle members and in axial alignment therewith, intermediate driving means including worms and associated internally threaded sleeves, liquid means intermediate the worm and sleeve to cushion the movement of one with respect to the other, shafts mounted in the gear for carrying one each of said associated members, one of each of said associated members connected to be driven by the driving gear, and one of each of said associated members connected to drive the aligned axle members, one of said associated members being driven by the other and also adapted for limited independent forward movement with respect to the others of said associated members.

11. A differential driving mechanism of the class described, comprising a pair of axially aligned axle members, a driving gear intermediate of the ends of said axle members and in axial alignment therewith, a tubular shaft mounted in the driving gear, a second shaft slidably in and adapted to be driven by the tubular shaft, a right hand threaded worm carried by one of said shafts, a left hand threaded worm carried by the other shaft, and an internally threaded sleeve mounted on each worm and connected to drive each of the aligned axle members.

12. A differential driving mechanism of the class described, comprising a pair of axially aligned axle members, a driving gear intermediate of the ends of said axle members and in axial alignment therewith, a tubular shaft mounted in the driving gear, a second shaft slidably in and adapted to be driven by the tubular shaft, a right hand threaded worm carried by one of said shafts, a left hand threaded worm carried by the other shaft, liquid means intermediate the worm and sleeve to cushion the movement of one with respect to the other, and an internally threaded sleeve mounted on each worm and connected to drive each of the aligned axle members.

13. A differential driving mechanism of the class described, comprising a pair of axially aligned axle members, a short shaft intermediate said aligned axle members, a driving gear mounted on said shaft intermediate of the ends of said axle members and in axial alignment therewith, worms axially aligned on opposite sides of the driving gear, axially aligned internally threaded sleeve operated by said driving gear and rotatably associated with said worms and connected to be driven thereby, the said worms, shaft and sleeves adapted for longitudinal movement with respect to each other, and means carried by the driving gear for rotatably supporting the same on said axle members.

14. A differential driving mechanism of the class described, comprising a pair of axially aligned axle members, a driving gear mounted intermediate of the ends of said axle members and in axial alignment therewith, worms axially aligned on opposite sides of the driving gear, axially aligned internally threaded sleeves mounted on said driving gear and rotatably associated with said worms and connected to be driven thereby, the said worms and sleeves adapted for longitudinal movement with respect to each other, liquid means intermediate the worm and sleeve to cushion the movement of one with respect to the other, and means carried by the driving gear for rotatably supporting the same on said axle members.

FREDERICK U. CONARD.